Nov. 21, 1961
J. J. WHITE
3,009,711
HELICOPTER TOW DOLLY
Filed May 20, 1959
2 Sheets-Sheet 1
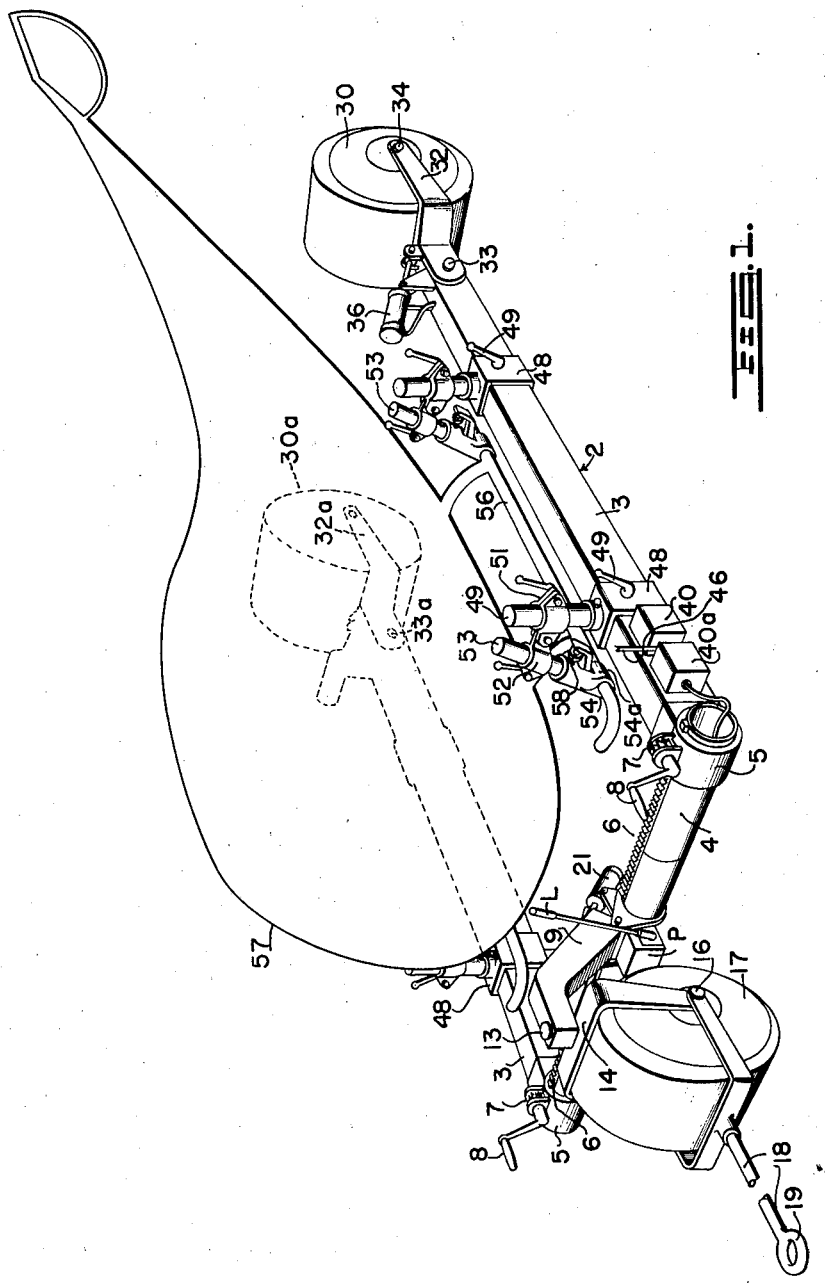
INVENTOR
JOHN J. WHITE
BY *H. Fredrick Hamann*
ATTORNEY Nov. 21, 1961  J. J. WHITE  3,009,711
HELICOPTER TOW DOLLY
Filed May 20, 1959  2 Sheets-Sheet 2
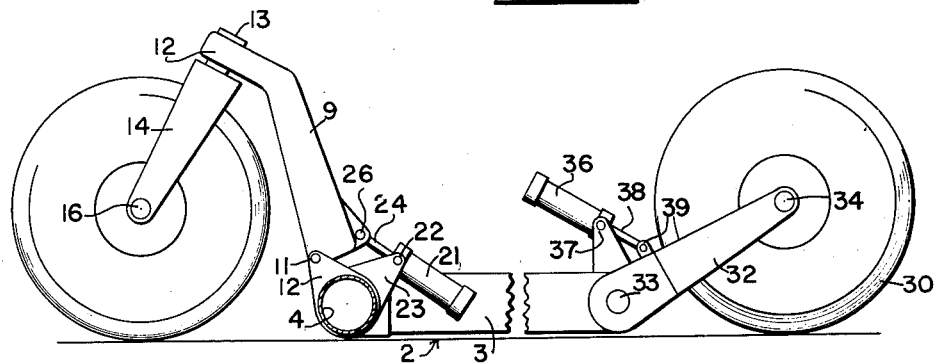
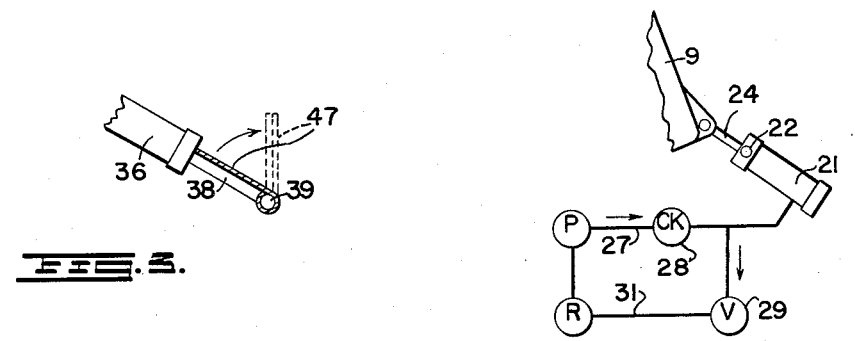
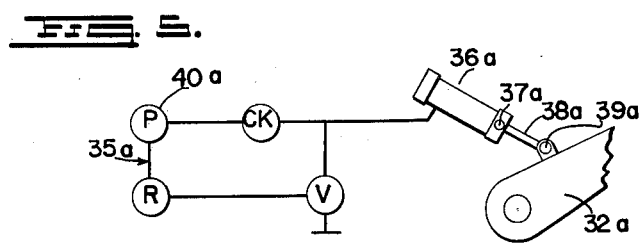
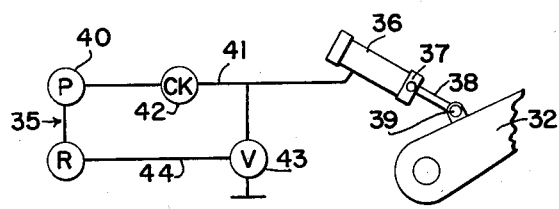
INVENTOR
JOHN J. WHITE
BY H. Fredrick Hamann
ATTORNEY Patented Nov. 21, 1961

3,009,711
HELICOPTER TOW DOLLY
John J. White, Bethesda, Md., assignor to ACF Industries, Incorporated, New York, N.Y., a corporation of New Jersey
Filed May 20, 1959, Ser. No. 814,547
4 Claims. (Cl. 280—43.23)

This invention relates to dollies and, more particularly, to a tow dolly adapted for use in raising and transporting a helicopter.

Briefly, the present invention contemplates the provision of a dolly comprising a U-shape frame supported upon a front steering wheel and two trailing wheels, whereby the U-shape frame may be moved into position to straddle a helicopter. Clamp members are provided on the frame to engage the helicopter landing skids, and means are provided for raising or lowering the frame relative to the three supporting wheels.

An object of the invention resides in the provision of a helicopter tow dolly which is relatively simple and inexpensive in construction and reliable in operation.

Another object of the invention resides in the provision of a dolly frame comprising parallel side rails interconnected at their front ends by a cross member, and means to move said side rails toward or away from each other along said cross member to accommodate helicopters of different sizes and to collapse the dolly for storage.

A further object of the invention resides in the provision of a dolly wherein the dolly frame is supported upon three wheels, and means are provided for raising or lowering the frame relative to said wheels.

Another object of the invention resides in the provision of a dolly wherein the three wheels are pivotally connected to the dolly frame and movable relative thereto responsive to operation of a hydraulic system.

Another object of the invention is to provide mechanical safety stops to prevent accidental lowering of the dolly frame in the event of failure of the hydraulic system.

Another object of the invention resides in the provision of a dolly frame provided with universally adjustable clamps for detachable engagement with helicopter landing gear skids.

The invention embodies other novel features, details of construction and arrangement of parts which are hereinafter set forth in the specification and claims and illustrated in the accompanying drawings, forming part thereof, wherein:

FIG. 1 is a perspective view illustrating a helicopter tow dolly embodying features of the invention, the dolly frame being shown in its raised position.

FIG. 2 is a side elevation illustrating the dolly frame in its lower position.

FIG. 3 is a fragmentary detail view illustrating a mechanical stop means operable to prevent accidental lowering of the dolly frame relative to the wheels.

FIGS. 4 and 5 are schematic views illustrating the hydraulic system employed for raising and lowering the dolly frame.

Referring now to the drawings for a better understanding of the invention, the helicopter tow dolly is shown as comprising a U-shape frame 2 embodying parallel side rails 3—3 interconnected at their forward ends by a tubular cross member 4. To vary the spacing between the side rails 3—3 to accommodate helicopters of different sizes, bearings 5—5 are provided on the front ends of their respective side rails to slidably receive the ends of the tubular cross member 4.

Racks 6—6 are secured to the cross member 4 for engagement by pinions 7—7 journaled on the bearings 5—5, each pinion being provided with a hand crank 8, whereby manual rotation of a pinion 7 acts against its rack 6 to move its side rail along the cross member 4. The bearings 5—5 are formed with grooves to receive their respective racks which act to prevent pivotal movement of the side rails 3—3 relative to the cross member 4.

A frame support arm 9 is pivotally connected at 11 to and between a pair of bearing brackets 12—12 secured to the medial portion of the cross member 4, the outer end of the arm being provided with a bearing 12 to receive a journal 13 formed on a front wheel fork 14. An axle 16 extends through the legs of the fork 14 to support a front wheel 17 and a draw bar 18, the latter being formed with an eye 19 for detachable engagement with a draw bar pin of a conventional power tractor.

A hydraulic cylinder 21 is pivotally connected at 22 to and between a pair of bearing brackets 23 secured to the cross member 4. A piston 24 is mounted in the cylinder 21 and pivotally connected at 26 to the frame support arm 9. A conventional hydraulic pressure pump P is mounted on the cross member 4 and manually operated by a lever L to supply liquid under pressure through a conduit 27 and check valve 28 into the cylinder 21 to cause the piston 24 to pivot the arm 9 in a direction to raise the front end of the frame 2. To lower the frame 2 by gravity, a valve 29 is opened to permit liquid to pass from the cylinder 21 through a return conduit 31 to a fluid reservoir R.

Identical rear wheel forks 32—32a are pivotally connected at 33—33 to the back ends of their respective side rails 3—3 and provided with axles 34—34 to receive rear wheels 30—30. Individual identical hydraulic power systems 35—35a are provided to pivot their respective forks 32—32 to raise the rear end of the frame 2 from the ground.

Each hydraulic power system 35 or 35a is shown as comprising a cylinder 36 pivotally mounted at 37 on the frame 2 and provided with a piston 38 which is pivotally connected at 39 to its rear wheel fork 32. Liquid under pressure is supplied by a pump 40 through a conduit 41 and check valve 42 to its cylinder 36 to actuate the piston and move the fork 32 in a direction to raise the frame 2 from the ground. To lower the frame 2 by gravity, a valve 43 is opened in a return conduit 44 leading from the cylinder 36 to a liquid reservoir R. The pumps 40—40a are provided with a common manually operable actuating lever 46 whereby pressurized liquid is supplied simultaneously to the cylinders 36—36a.

To prevent accidental lowering of the frame 2, stop arms 47 are pivotally mounted at 26, 39 and 39a for abutting engagement against their respective cylinders 21, 36 and 36a, as illustrated in FIG. 3.

A pair of identical clamp supporting fittings 48—48 are slidably mounted on each side rail 3 and secured in adjusted position by lock screws 49. Each fitting is provided with an upright stud shaft 59 to receive an adjustable locking collar 51 for pivotal connection to a clamp supporting collar 52. A clamp arm 53 is adjustably mounted in the collar 52 and provided with clamping fingers 54—54a to engage a skid 56 of a helicopter 57. The finger 54 is pivotally connected to the arm 53 and movable relative to the finger 54a by an adjustable screw 58.

Having described a preferred embodiment of the present invention, it is to be understood that although specific terms and examples are employed, they are used in a generic and descriptive sense and not for purposes of limita-

What is claimed is:

1. In a helicopter tow dolly, a frame including spaced side rails, said side rails being provided at their forward end portions with aligned bearings, means forming an interconnection at the forward ends of said side rails including a cross member having its terminals arranged in said aligned bearings, a rack structure mounted at each end of said cross member and extending longitudinally thereof, a gear mounted on each of said side bearings and normally meshing with said rack structure, means for rotating said gears for adjusting said side rails on said cross member, a front wheel, means pivotally supporting said front wheel medially of said cross member, power means for adjusting said pivoted supporting means vertically for raising and lowering the front end of said dolly structure, wheel mounts supported by the rear end portions of said side rails, pivoted means supporting said wheel mounts, wheels carried by said wheel mounts, and power means for swinging said wheel mounts for adjusting the vertical position of the rear ends of said side rails.

2. The structure of claim 1 characterized in that the rack structure is mounted in a longitudinally extending groove in the cross member and the end portions of the rack structure project outwardly to provide keys for engaging in keyways in said aligned bearings at the forward end portions of the side rails.

3. The structure of claim 1 characterized in that clamp supporting fittings are slidably mounted on each side rail and each fitting includes a vertical post structure for mounting vertically adjustable clamps.

4. The structure of claim 1 characterized in that the means pivotally supporting the front wheel comprises an upwardly and forwardly projecting arm pivoted on a cross pin mounted on the cross member and having its axis parallel to the axis of the cross member.

References Cited in the file of this patent

UNITED STATES PATENTS

| | | |
|---|---|---|
| 1,589,783 | Arndt | June 22, 1926 |
| 2,002,002 | Brown | May 21, 1935 |
| 2,248,080 | Hathaway | July 8, 1941 |
| 2,798,729 | Paul | July 9, 1957 |
| 2,815,566 | Hille | Dec. 10, 1957 |
| 2,830,519 | Chandler | Apr. 15, 1958 |
| 2,836,315 | Fuhrmann | May 27, 1958 |
| 2,893,747 | Hamblin | July 7, 1959 |

FOREIGN PATENTS

| | | |
|---|---|---|
| 451,886 | Great Britain | Aug. 13, 1936 |